United States Patent
Barenreuter et al.

(10) Patent No.: US 9,079,276 B2
(45) Date of Patent: Jul. 14, 2015

(54) METHOD FOR PRODUCING PISTON RINGS

(75) Inventors: Dirk Barenreuter, Odenthal (DE);
Markus Kellner, Leverkusen (DE)

(73) Assignee: Federal-Mogul Burscheid GmbH,
Burscheid (DE)

( * ) Notice: Subject to any disclaimer, the term of this patent is extended or adjusted under 35 U.S.C. 154(b) by 93 days.

(21) Appl. No.: 13/580,783

(22) PCT Filed: Feb. 9, 2011

(86) PCT No.: PCT/DE2011/000119
§ 371 (c)(1),
(2), (4) Date: Aug. 23, 2012

(87) PCT Pub. No.: WO2011/103853
PCT Pub. Date: Sep. 1, 2011

(65) Prior Publication Data
US 2012/0319357 A1 Dec. 20, 2012

(30) Foreign Application Priority Data
Feb. 23, 2010 (DE) .......................... 10 2010 008 924

(51) Int. Cl.
*B23P 15/06* (2006.01)

(52) U.S. Cl.
CPC ...................................... *B23P 15/06* (2013.01)

(58) Field of Classification Search
CPC ......... B23P 15/06; B23P 15/065; B23P 15/08
USPC .......... 29/888.074, 888.07, 888.075, 888.076
See application file for complete search history.

(56) References Cited

U.S. PATENT DOCUMENTS

| 1,732,631 A | * | 10/1929 | Bennet | 82/19 |
| 2,367,159 A | * | 1/1945 | Van Der Horst | 205/128 |
| 5,605,741 A | * | 2/1997 | Hite et al. | 277/443 |

FOREIGN PATENT DOCUMENTS

| DE | 2135338 A1 | 1/1973 |
| DE | 3144335 A1 | 5/1983 |
| DE | 19809659 C1 | 9/1999 |
| DE | 19844335 C1 | 9/1999 |
| EP | 1762756 A2 | 3/2007 |
| GB | 542758 A | 1/1942 |
| GB | 633457 A | 12/1949 |
| GB | 1132351 A | 10/1968 |
| GB | 1441961 A | 7/1976 |
| GB | 1561788 A | 3/1980 |
| GB | 2254905 A | 10/1992 |
| GB | 2262945 A | 7/1993 |

(Continued)

*Primary Examiner* — Christopher Besler
(74) *Attorney, Agent, or Firm* — Robert L. Stearns; Dickinson Wright, PLLC

(57) ABSTRACT

A method for producing piston rings, in particular compression piston rings, in which at least one main element is machined in such a way that a circumferential surface serving as a running surface is provide with a wear-resistant layer of a predeterminable layer thickness, wherein a number of piston ring, in particular compression piston rings, brought together to form an assembly, are machined cylindrically in the region of their circumferential surface, a wear-resistant electrodeposited layer of chrome is applied to the finished machined cylindrical circumferential surface, so that the wear-resistant layer has a constant layer thickness within the assembly as a whole, and subsequently the layer is machined in such a way as to produce a running surface that has a region of maximum layer thickness and at least one region of minimum layer thickness.

5 Claims, 1 Drawing Sheet

(56) References Cited

FOREIGN PATENT DOCUMENTS

| JP | 55134166 A | 10/1980 |
| JP | S57131396 A | 8/1982 |
| JP | S58663 A | 1/1983 |
| JP | 60188661 A | 9/1985 |
| JP | H04211764 A | 8/1992 |
| JP | H0544842 A | 2/1993 |
| JP | 10103519 A | 4/1998 |

* cited by examiner

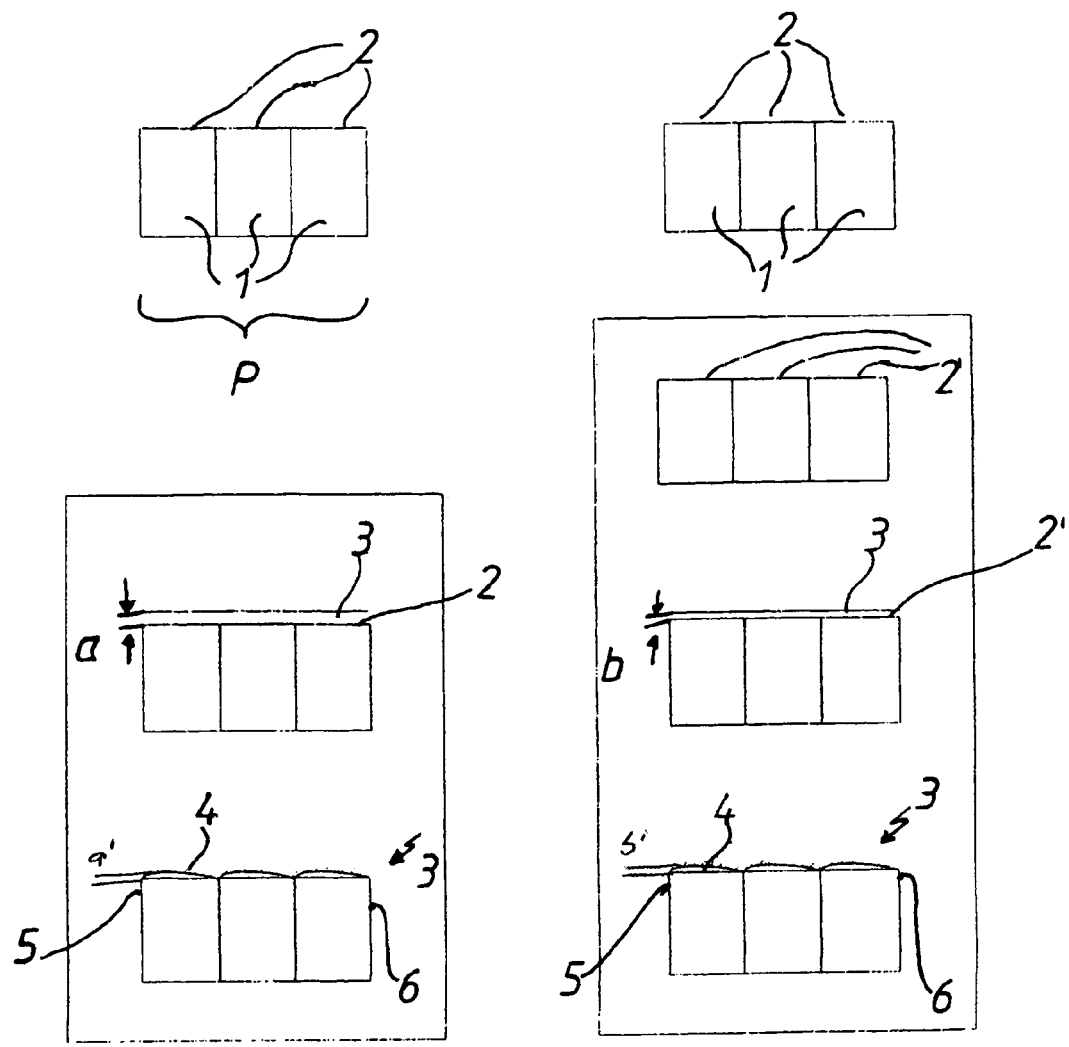

METHOD FOR PRODUCING PISTON RINGS

BACKGROUND OF THE INVENTION

1. Technical Field

This invention concerns a method for machining piston rings—compression piston rings in particular—that are in accordance with a mate-forming part of the initial patent claim

2. Related Art

In many cases, piston rings are produced in such a way that they are cylindrically machined on their outer peripheral surface. External turning is subsequently used to produce a contour that will be needed at a later point; this contour is referred to as a bearing surface contour. A wear-resistant layer is then applied to this above-mentioned bearing surface contour—this could, for example, be a chromium layer—which is reflected on the machined contour and on the one that follows. The final running surface geometry is created by cylindrical lapping. In order to execute this work step within a reasonable period of time and with the correct convexity, the contact surface must already have a contour at this point that is very close to the finished contour.

The external turning work step for producing the desired contour on the outside peripheral surface is extremely time and cost intensive.

DE 31 44 335 C2 shows a process for producing rotationally symmetrical work pieces—piston rings in particular—that are provided with a wear-resistant layer, whereby the work pieces are packetized and centrally clamped onto a mandrel, and the outer peripheral surface is then coated with a wear-resistant layer, and the package is again separated into its individual work pieces. Before the coating process, the packetized work pieces are scanned in the axial direction, whereby the axial position of each contact surface between the individual work pieces is determined and stored, and this data is made available to one or several cutting tools for detecting the contact surfaces after the work pieces have been coated.

The DE 198 09 659 C1 method for producing piston rings—for the internal combustion engine in particular—is already known, whereby this method taps individual rings on non-circular connectors consisting of metallic work pieces. The bushings are produced by thermally spraying spray material onto the outer surface of a mandrel serving as a mould, whereby the mandrel has an impact mark on the peripheral surface, and a layer that functions as a sliding layer is applied to the generated lateral surface on the bushings, and the piston rings for the bushing are subsequently tapped.

SUMMARY OF THE INVENTION

This invention is the basis for the task of creating a simplified method for producing piston rings—compression piston rings, in particular—that is optimised in terms of the current production method, and one that will cost less.

It is moreover the task of this invention to provide a piston ring produced according to this method that has an optimized layer structure on the bearing area.

This problem is solved by combining several piston rings—compression piston rings, in particular—into one packet near the peripheral surface where they are cylindrically machined, and by applying a wear-resistant, electroplated chromium layer to the finish-machined cylindrical peripheral surface, so that the wear-resistant layer has a constant, even thickness to the layer within the packet, and the layer is subsequently machined in such a way that it produces a running surface that has one area where the layer is the maximum thickness, and at least one area that has a minimum thickness.

This problem shall also be solved by a piston ring—a compression piston ring, in particular, that is manufactured according to the invention-related process—that includes a base body that has a cylindrical outer peripheral surface on which a wear-resistant layer of coating is applied, whereby this layer alone is provided with a geometric contour predetermined as the bearing surface.

The invention-related process allows the outer contour turning work step to be skipped, which saves time and therefore money, in contrast to the previous method. The advantage of this is that the piston rings—compression piston rings in particular—are combined into one packet on the mandrel, so that this package can be cylindrically machined in the area of its outer peripheral surface, which will later form the bearing surface.

As with the general state-of-the-art as well, the package's outer peripheral can be machined by contour turning the mould cylindrically.

If necessary, this outer peripheral surface that has been pre-machined in this manner can undergo an additional cylindrical grinding step. Even if this additional grinding step is not absolutely necessary, it would still result in savings—in contrast to the saved contour-turning process—due to the fact that the electroplated layer and subsequent volumes that must be processed would fail less—especially when dealing with minimal chromium layer thicknesses.

Basically, a smooth cylinder with minimal current can be electro-chrome-plated due to the smaller surface, as opposed to an existing mandrel made of pre-profiled rings. Thus, in addition to lower power consumption, a better distribution of layer thickness can be expected on the machined cylindrical outer peripheral surface.

The wear-resistant layer that has a layer thickness that can be predetermined is then machined by means of profile grinding in order to adjust the bearing surface contour.

According to another aspect of this invention, the wear-resistant layer undergoes spherical processing, whereby the load-bearing region of the layer, which becomes the mating surface for another bearing surface later on, has a maximum layer thickness that is reduced towards at least one of the bearing surface edges of the piston ring such that a minimum layer thickness is specified at this point.

Depending on the application, this load-bearing area can be situated either in the centre, i.e. at about half the axial height of the piston ring, or in one of the boundary areas.

Suitable profile grinding tools can provide the required bearing surface contour without any risk of penetrating into the piston ring material in the edge regions of the piston ring.

THE DRAWING

The drawing shows the object of the invention for clarification, and is described as follows:

DETAILED DESCRIPTION

Two examples for producing piston rings are shown in this single FIGURE—Compression piston rings, in particular. In both examples, base body 1, which is made of cast iron, for example, are combined to form a packet P that is only indicated, and base body 1 is subjected to contour turning, such that this process forms an outer cylindrical peripheral surface 2.

In the example at left, an electroplated, chrome, wear-resistant layer 3 of predetermined layer thickness a is directly applied to the cylindrical peripheral surface 2. Layer 3 is now the only layer to be machined using a profile grinding tool (not shown) in such a way that it produces a rounded contour 4, which in this example, has a maximum thickness of a' in one of the bearing surface edge regions 5, whereas the layer thickness for the other bearing surface edge area 6 is provided in minimized form.

In the example at right, the cylindrical grinding step is performed after the cylindrical contour turning step, whereby the contour-rotated, cylindrical peripheral surface 2 now represents an additional cylindrical outer peripheral surface 2', due to the removal of material which has been further minimised. Similar to the example at left, only this layer 3 is machined by means of a suitable profile grinding tool (not shown to form a spherical contour 4. Similar to the example at left, the layer thickness b' in the left bearing surface edge region 5 is larger than on the right bearing surface edge area 6. To ensure that a minimum wear layer is given in edge area 6 as well, there must be a certain allowance in the design of the electroplated layer thickness a, b, in order not to grind through to the base material on base body 1 in edge area 6 during the subsequent profile machining of layer 3. The minimum thickness a', b' of the chromium layer 3 must be measured at the load-bearing location, i.e. at the apex of the convexity. The theoretical minimum thickness of a', b' at this location is derived from the value of the convexity and the value of certainty in edge area 6.

The invention claimed is:

1. A method for making piston rings, comprising:
    preparing a packet of a plurality of piston ring bodies, each piston ring body presenting a peripheral surface extending axially between two edge regions, wherein each of the plurality of piston ring bodies of the packet are arranged such that at least one edge region is directly abutting an edge region of another piston ring body of the plurality of piston ring bodies;
    contour turning the peripheral surfaces of the packet of piston ring bodies together to provide a cylindrical contour;
    electro-plating a wear-resistant chrome layer of uniform thickness on to the cylindrical contour of the packet; and
    further profile grinding the electro-plated wear-resistant chrome layer on the packet of piston ring bodies together to provide a profiled running surface on each of the plurality of piston ring bodies,
    wherein the profiled running surface has a thickness, and the thickness decreases from a maximum thickness located at one of the edge regions to a minimum thickness located at the other edge region.

2. The method of claim 1 wherein the wear-resistant chrome layer has a part-spherical profile.

3. The method of claim 1 wherein the profiled running surface is further formed by convex machining.

4. The method of claim 1 wherein the contour turned peripheral surface of the piston ring bodies is formed to have a different profile than that of the respective wear-resistant chrome layer.

5. The method of claim 4 wherein the profile of the contour turned peripheral surface of the piston ring bodies is generally flat in profile between the opposite edge regions.

* * * * *